United States Patent [19]
Libkie

[11] 3,887,109
[45] June 3, 1975

[54] VALVE ARRANGEMENT FOR A VEHICULAR INFLATABLE CUSHION

[75] Inventor: Herbert A. Libkie, Marlette, Mich.

[73] Assignee: General Motors Corporation, Detroit, Mich.

[22] Filed: May 13, 1974

[21] Appl. No.: 469,311

[52] U.S. Cl. .............................. 222/3; 280/150 AB
[51] Int. Cl. ............................................. B60r 21/10
[58] Field of Search .............. 222/3, 5; 280/150 AB; 9/316–320

[56] References Cited
UNITED STATES PATENTS

| | | |
|---|---|---|
| 3,640,546 | 2/1972 | Brawn ........................ 280/150 AB |
| 3,663,036 | 5/1972 | Johnson ............................. 222/5 X |
| 3,777,772 | 12/1973 | Arnold et al. ............ 280/150 AB X |
| 3,815,935 | 6/1974 | Jones .................................. 222/3 X |

Primary Examiner—Stanley H. Tollberg
Assistant Examiner—John P. Shannon
Attorney, Agent, or Firm—John P. Moran

[57] ABSTRACT

An improved outlet valve arrangement including improved attachment means for use in operatively connecting an inflater to a diffuser of an automotive inflatable cushion assembly.

2 Claims, 6 Drawing Figures

PATENTED JUN 3 1975　　3,887,109

SHEET 1

VALVE ARRANGEMENT FOR A VEHICULAR INFLATABLE CUSHION

The invention relates generally to vehicular inflatable cushion-type occupant restraint systems and, more particularly, to an outlet valve arrangement suitable for readily operatively interconnecting an inflator and a diffuser thereof.

A primary object of the invention is to provide an improved valve arrangement which is efficient in operation and, once threadedly installed on an inflator, is readily and quickly assembled to a diffuser.

Another object of the invention is to provide an improved outlet valve assembly including an outlet member which is threadedly connected to an inflator and the resultant assembly then quickly connected to a diffuser by simply inserting the outlet member through an elongated opening formed in the diffuser, wherein tapered end surfaces extending laterally from the outlet member spread a pair of lock springs retained vertically in the diffuser prior to the extended ends snapping into aligned openings formed in the lock springs, for possible future actuation of the associated inflatable cushion.

A further object of the invention is to provide an improved outlet valve assembly for use with an inflatable cushion diffuser and including an outlet member having a cylindrical end-portion and an externally threaded end-portion extending from a hexagonally-shaped central portion, the threaded end thereof being connected to an inflator, with the cylindrical end thereof having an axial bore formed therethrough and a transverse bore formed thereacross adjacent a closed end thereof, a thrust neutralizer tube mounted through the transverse bore and having tapered end surfaces formed thereon, such outlet valve assembly being inserted through a contoured opening formed in a bottom surface of the diffuser, and the tapered end surfaces serving to spread an oppositely disposed pair of resilient lock members retained in a spaced parallel relationship in retention slots formed in the diffuser, the laterally extending ends snapping into aligned openings in the lock members to retain the assembly in operative position.

These and other objects and advantages of the invention will be apparent when reference is made to the following description and accompanying drawings, wherein.

Figure 1:
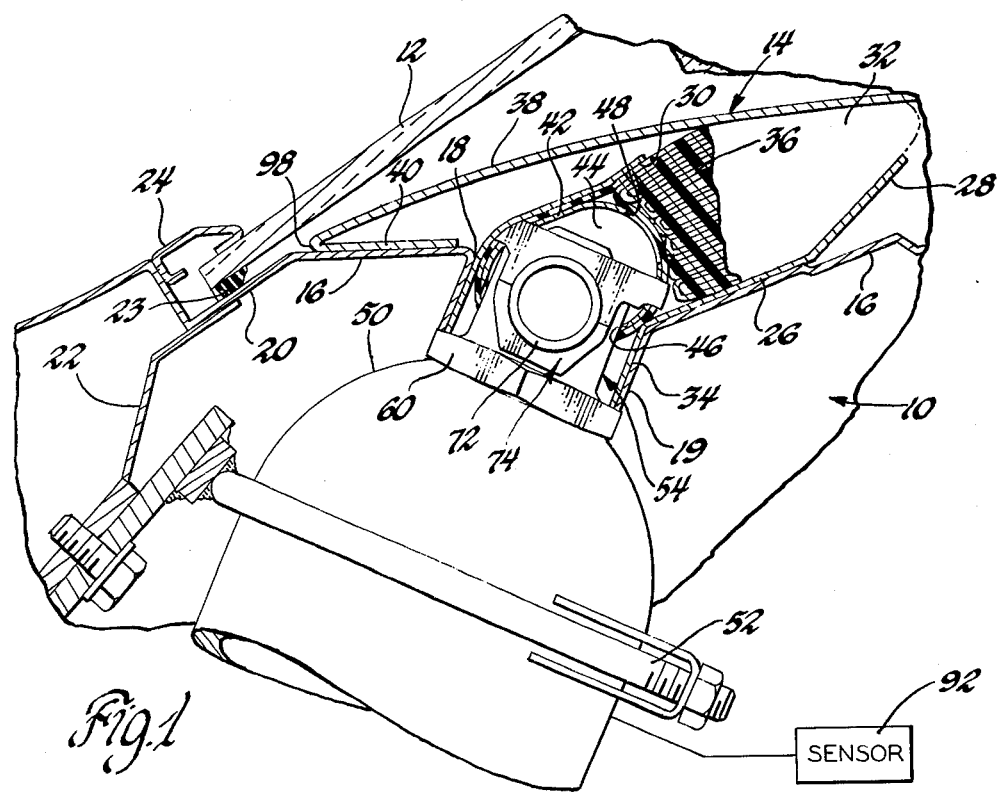
FIG. 1 is a fragmentary cross-sectional view of an automotive instrument panel embodying the invention.

Referring now to the drawings in greater detail, FIG. 1 illustrates an automobile or vehicle body, designated generally 10, including a windshield 12 and an instrument panel structure designated generally 14. An upper wall 16 of the instrument panel 14 includes a recess 18 which extends for the major extent of the upper wall 16 intermediate the windshield pillars (not shown) of the vehicle body 10. A cylindrical openended extension 19 provides a circular opening at an intermediate point along the bottom of the wall 16. The wall 16 further includes an off-set flange 20 which is connected in a conventional manner to the cowl structure 22 of the body 10. The lower edge of the windshield 12 is received with the off-set flange 20 and adhesively secured thereto at 23. A garnish molding 24 completes the assembly.

A housing or trough 26 having a generally U-shaped cross-section is secured within the recess 18. Respective terminal portions or side walls 28 and 30 of the housing 26 are offset to define a throat 32 which opens or extends generally rearwardly and upwardly of the vehicle body 10. A cylindrical open-ended extension 34 is formed at an intermediate point along the bottom of the U-shaped trough 26, coinciding with the cylindrical extension 19, such that the cylindrical extension 34 fits closely within the cylindrical extension 19, while a full-length portion of the side wall 28 lies against a portion of the wall 16.

An inflatable cushion 36 is received within the throat 32 when undeployed, a typical cushion being disclosed in detail in copending applications Ser. Nos. 255,025, Parr et al. and 255,026 Knight IV et al., concurrently filed May 19, 1972. A cover plate 38 includes a return bent off-set leg 40 bearing against the upper wall 16 of the instrument panel 14, forward of the recess 18. A diffuser 42 of generally oval or flattened cylindrical cross-section, forming an inner chamber 44, is mounted adjacent the cushion 36 and fitted within the forward end-portion of the housing 26. A contoured opening 46 (FIG. 5) is formed in the bottom portion of the diffuser 42 in axial alignment with the cylindrical extensions 19 and 34, while an opening 48 is formed in an upper portion of the diffuser 42, providing communication between the inner chamber 44 of the diffuser 42 and the cushion 36, for transmission of pressure fluid from the former to the latter to deflate the latter as required.

An inflator or pressure vessel 50, shown as a gas generator, is mounted by means of a conventional U-bolt arrangement 52 on the cowl 22 of the vehicle body 10. An outlet valve assembly 54 (FIG. 2) includes a member 56 having an externally threaded end-portion 58 formed on one end thereof adjacent a hexagonally shaped central portion 60. The end-portion 58 is threadedly mounted in an internally threaded opening 62 formed in the inflator 50, sealing off the latter.

An axially extending cylindrical outlet or neck 64 extends from the member 56, on the end thereof opposite the threaded end-portion 58. An axial passage 66 is formed in the member 56, the passage 66 being closed off at the upper end thereof by an end wall 68 formed on the neck 64. Oppositely disposed flat sides 69 (FIGS. 2–4) are formed on the end wall 68 to avoid interference with the walls of the diffuser 42, once the neck 64 is inserted through the opening 46. A transverse bore or passage 70 is formed in the neck 64 of the member 56 adjacent the end wall 68 thereof, for the purpose of forcing any gas flowing from the inflator 50, through the passage 70, and into the inner chamber 44 of the diffuser 42 to turn 90° before entering therein.

Figure 2:
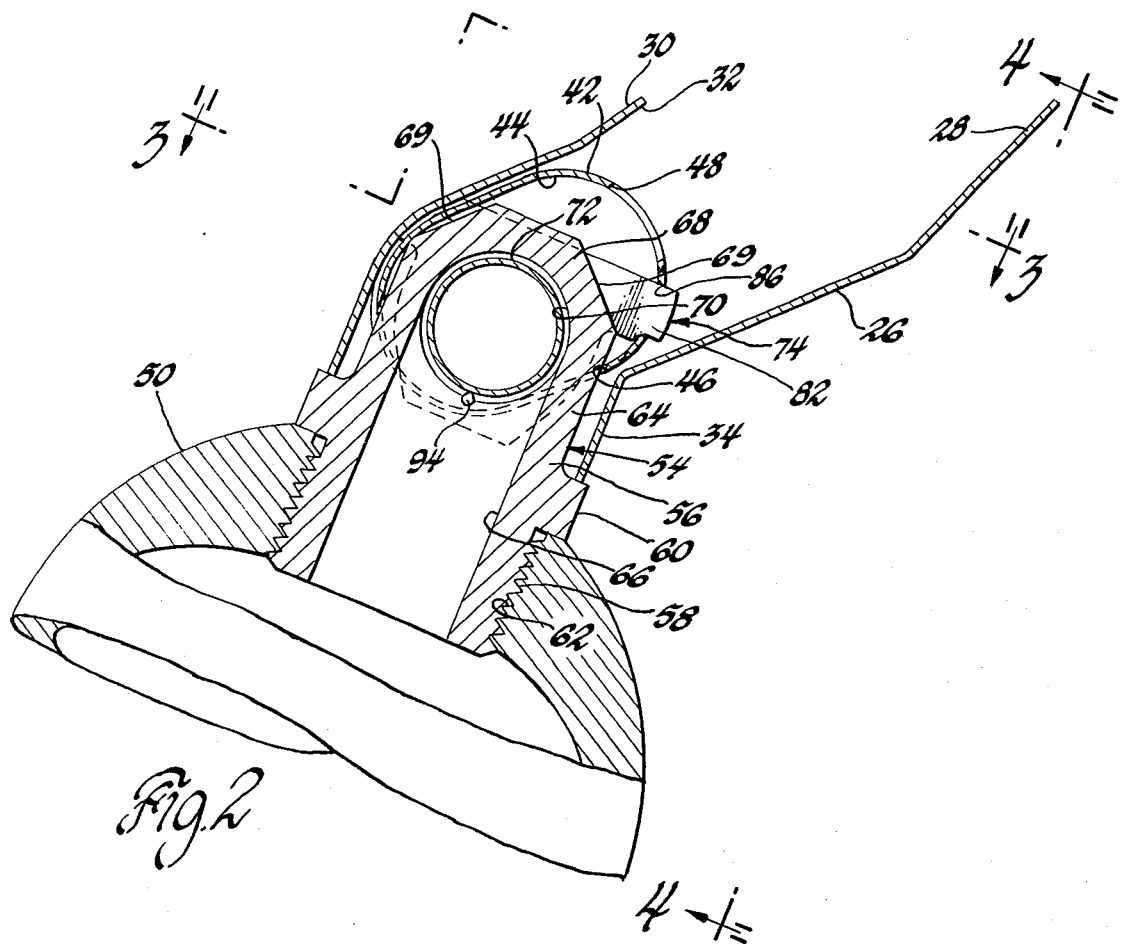
FIG. 2 is an enlarged fragmentary cross-sectional view of a portion of the FIG. 1 structure.
Figure 3:
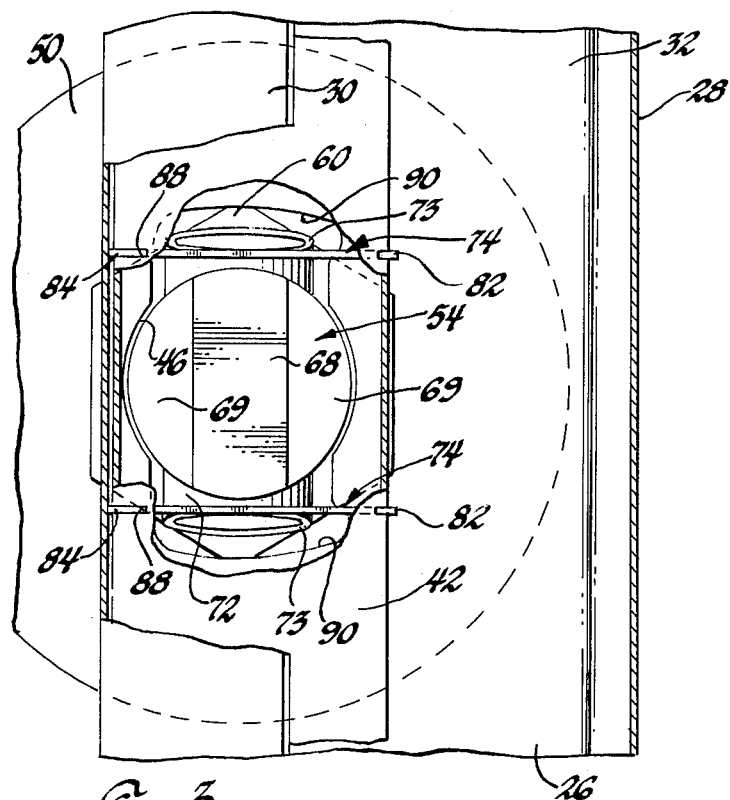
FIG. 3 is a fragmentary cross-sectional view taken along the plane of line 3—3 of FIG. 2, and looking in the direction of the arrows.
Figure 5:
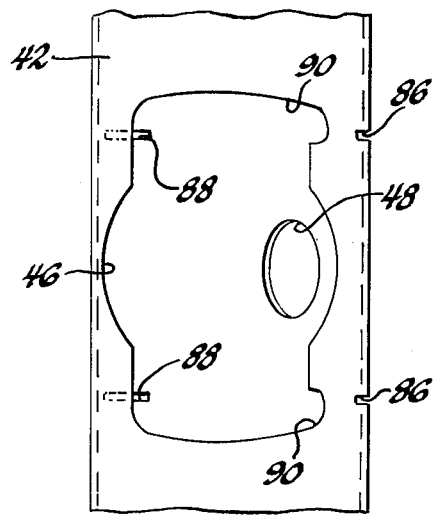
FIG. 5 is a fragmentary view illustrating a feature of the invention more clearly.
Figure 6:
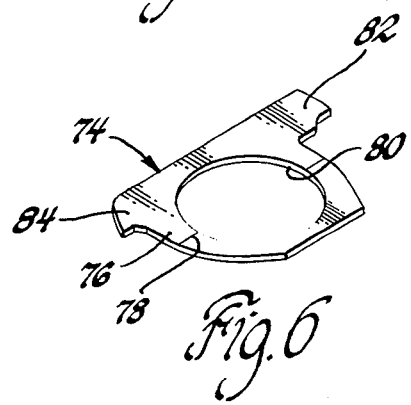
FIG. 6 is a perspective view of a portion of the invention.

As may be noted in FIGS. 2 and 3, a thrust neutralizer tube 72 is inserted through the passage 70, having tapered ends 73 extending from both ends of the passage 70, and secured therein by any suitable means, such as welding. A pair of lock springs 74 [one right-hand and one left-hand], shown in FIG. 6 apart from the assembly, are each formed to include a side wall 76 having a slight bend 78 formed thereacross and an opening 80 formed therethrough, with oppositely disposed, differently-shaped tabs 82 and 84 formed at the top of the side wall 76. As shown in FIG. 5, a pair of spaced slots 86 are formed in one side wall of the diffuser 42, while a pair of spaced slots 88 are formed in the opposite side wall of the diffuser 42, respectively aligned with the slots 86.

Each lock spring 74 is mounted in the diffuser 42 with its tabs 82 and 84 extended through a set of the aligned slots 86 and 88, respectively, with each bend 78 located such that the lower portion of each side wall 76 flares outwardly, i.e., away from the other side wall 76.

Referring once again to FIG. 5, it may be noted that the contoured opening 46 in the diffuser 42 is formed to include oppositely disposed slotted areas 90 to accommodate the insertion therethrough of the extended ends 73 of the thrust neutralizer tube 72. Thus, it may be realized that when the outlet valve assembly 54, with its associated inflator 50, is to be mounted on the diffuser 42, once the end wall 68 is inserted through the opening 46, the tapered ends 73 of the tube 72 will contact the flared side walls 76 of the respective lock springs 74, and spread same until the tapered ends 73 snap through the respective openings 80 of the lock springs 74 (FIG. 4), to thus retain the outlet valve assembly 54 and associated inflator in their operative positions.

Removal of the outlet valve assembly 54 is likewise readily accomplished in that the lock springs 74 need only be manually spread by reaching through the slotted areas 90, and the assembly 54 withdrawn through the opening 46.

Figure 4:
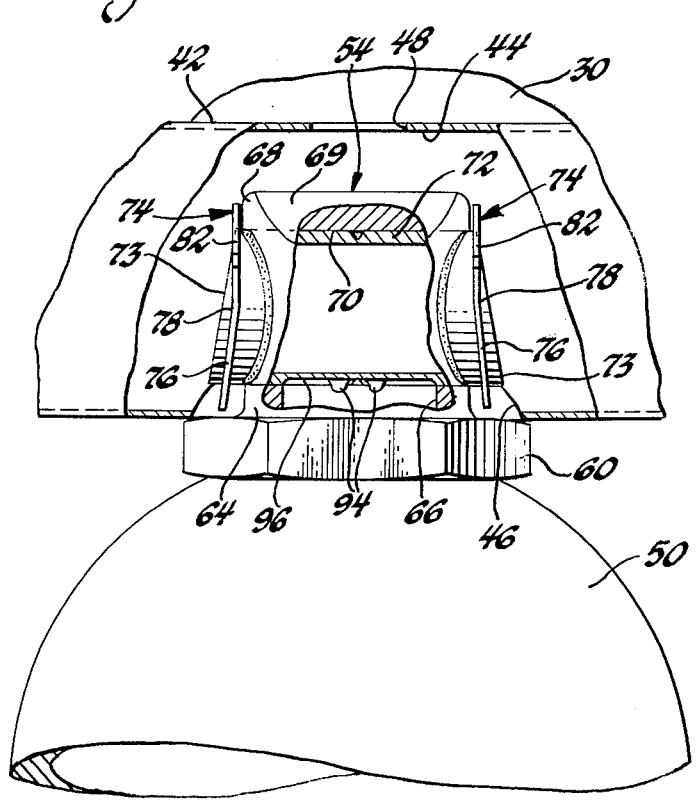
FIG. 4 is a fragmentary cross-sectional view taken along the plane of line 4—4 of FIG. 2, and looking in the direction of the arrows.

The inflator 50 is actuated by a sensor 92 of any suitable type, i.e., one which senses either velocity changes or acceleration pulses of predetermined amplitude and time generated by contact of the vehicle body 10 with an obstacle, and electrically connects the inflator 50 with a source of power, such as the vehicle battery. Suitable detonators 94 are potted within the passage 66 on the underside of the tube 72, as in a slot 96 formed thereon (FIG. 4). The sensor 92 likewise simultaneously connects the detonators 94 with the power source, the detonators 94 serving, when energized, to blow out the wall of the tube 72 so that the pressure fluid generated by the inflator 50 flows from the passage 66 into the transverse passage 70 and laterally therefrom into the chamber 44 of the diffuser 42, and thence, through the opening 48 to deploy or erect the cushion 36.

As described in the above-referenced copending applications, when the cushion 36 is thus deployed from the throat 32, the cover plate 38 is swung forwardly and upwardly of the body 10 against the windshield 12, pivoting about the integral hinge 98 (FIG. 1) provided between the plate 38 and the bent off-set leg 40 thereof.

It should be apparent that the invention provides a simplified, efficient and readily installable outlet valve arrangement for sealed connection with an inflator and quickconnect and disconnect connection with a diffuser of a vehicular inflatable cushion assembly.

While but one embodiment of the invention has been shown and described, other modifications thereof are possible.

I claim:

1. For use with a housing containing an automotive inflatable cushion and having a cylindrical extension formed at an intermediate point along the underside thereof; a diffuser mounted in said housing adjacent said inflatable cushion and having a first opening formed at an intermediate point along the underside thereof and a second opening formed in the upper side thereof, and an inflator; an improved valve and connector arrangement therefor, comprising a valve member having a hexagonally-shaped central portion, means formed on one end thereof for connection with said inflator, and a cylindrical portion formed on the other end thereof, an axial passage formed through said valve member and an end-cap formed on said cylindrical portion, a transverse passage formed through said cylindrical portion adjacent said end-cap, a tubular member having tapered end surfaces formed on the ends thereof and being mounted in said transverse passage, said tapered end surfaces extending beyond the ends of said transverse passage, two pairs of aligned slots formed in oppositely disposed sides of said diffuser, said two pairs of slots being spaced a predetermined distance apart along the axis of said diffuser, a pair of resilient locking members each having tabs formed at the upper end thereof for mounting in said respective pairs of aligned slots, an opening formed in each of said resilient locking members, said valve member being operatively connected to said diffuser by having said cylindrical portion thereof inserted through said cylindrical extension and said first opening such that said tapered ends of said tubular member cause said resilient locking members to spread against the restraint of said tabs in said respective aligned slots until said ends of said tubular member snap through said respective locking member openings.

2. For use with a housing containing an automotive inflatable cushion and a diffuser mounted in said housing adjacent said inflatable cushion, an improvement comprising a first cylindrical extension formed at an intermediate point along the underside of said housing; a first opening formed at an intermediate point along the underside of said diffuser, said first opening being aligned with said first cylindrical extension; a second opening formed in the upper side of said diffuser; an inflator having an internally threaded opening formed therein; a valve and connector arrangement including a valve body having an externally threaded end-portion and a second cylindrical extension formed on opposite sides of a hexagonally shaped central portion, said externally threaded end-portion being threadedly connected to said internally threaded opening of said inflator, an axial passage formed through said valve body and an end-cap formed on said second cylindrical extension, a transverse passage formed through said second cylindrical extension adjacent said end-cap, a tubular member having tapered end surfaces formed on the ends thereof and being mounted in said transverse passage, said tapered end surfaces extending beyond the ends of said transverse passage, two pairs of aligned slots formed in oppositely disposed sides of said diffuser, said two pairs of slots being spaced a predetermined distance apart along the axis of said diffuser, a pair of thin metal plates each having a slight bend formed across an intermediate portion thereof causing the respective lower halves of said plates to spread apart from one another, oppositely disposed tabs formed at the upper ends of each of said plates for mounting in said respective pairs of aligned slots, and an opening formed in each of said plates such that approximately one-half of each of said openings is located above said bend and one-half is below said bend, said valve body being operatively connected to said diffuser by having said second cylindrical extension thereof inserted through said first cylindrical extension and said first opening such that said tapered ends of said tubular member cause said thin metal plates to spread an additional distance against the restraint of said tabs in said respective aligned slots until said ends of said tubular member snap through said respective plate openings, releasing the tension on said plates to thereby lock said valve body in place.

* * * * *